(12) United States Patent (10) Patent No.: US 12,222,703 B2
Grevers, Jr. et al. (45) Date of Patent: Feb. 11, 2025

(54) INTEGRATED REMOTE MANAGEMENT CONTROL VIA INDUSTRIAL AUTOMATION CONTROL SYSTEM

(71) Applicant: Dell Products L.P., Round Rock, TX (US)

(72) Inventors: Theodore R. Grevers, Jr., Milford, MA (US); James Meeker, Liberty Hill, TX (US)

(73) Assignee: Dell Products L.P., Round Rock, TX (US)

( * ) Notice: Subject to any disclaimer, the term of this patent is extended or adjusted under 35 U.S.C. 154(b) by 436 days.

(21) Appl. No.: 17/872,797

(22) Filed: Jul. 25, 2022

(65) Prior Publication Data

US 2024/0027999 A1 Jan. 25, 2024

(51) Int. Cl.
*G05B 19/4155* (2006.01)
*H04L 41/08* (2022.01)
*H04L 67/12* (2022.01)

(52) U.S. Cl.
CPC .......... *G05B 19/4155* (2013.01); *H04L 41/08* (2013.01); *H04L 67/12* (2013.01); *G05B 2219/31368* (2013.01)

(58) Field of Classification Search
None
See application file for complete search history.

(56) References Cited

U.S. PATENT DOCUMENTS

| 6,766,470 B1* | 7/2004 | Shah | G06F 11/0709 714/13 |
| 7,039,922 B1* | 5/2006 | Shah | G06F 13/4022 710/1 |
| 8,522,236 B2* | 8/2013 | Zimmer | G06F 9/45558 718/1 |
| 11,681,571 B2* | 6/2023 | Vajravel | G06F 9/44505 719/328 |
| 2018/0331900 A1* | 11/2018 | Kakaiya | H04L 12/413 |
| 2023/0098066 A1* | 3/2023 | Vajravel | G06F 9/44505 719/328 |

* cited by examiner

*Primary Examiner* — Quang N Nguyen
(74) *Attorney, Agent, or Firm* — Jackson Walker L.L.P.

(57) ABSTRACT

A disclosed method includes loading a driver stack for an industrial automation control (IAC) communication protocol into a management controller of a server, connecting the management controller to an IAC network interconnect, and communicating with the driver stack to perform operations for integrating the management controller into the IAC network as a remotely manageable resource of the IAC network. The integrating may include discovering the management controller, obtaining configuration information from the management controller, indicative of a configurable management controller resource, and configuring a setting of the resource. The configurable management controller resource may be a network interface card (NIC) and the configurable setting may be an Internet protocol (IP) address of the NIC. In at least some embodiments, the driver stack is a PROFINET stack and performing the operations includes Discovery and Basic Configuration Protocol (DCP) requests and responses.

17 Claims, 2 Drawing Sheets

INTEGRATED REMOTE MANAGEMENT CONTROL VIA INDUSTRIAL AUTOMATION CONTROL SYSTEM

TECHNICAL FIELD

The present disclosure relates to industrial automation and, more particularly, managing information technology infrastructure within an industrial automation control environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are generally characterized as information technology (IT) assets. IT assets may be contrasted with the operational technology (OT) assets, which are most typically found in factories and other industrial environments. For purposes of this disclosure, an OT asset may refer to any industrial automation device, i.e., robot, and the industrial automation control systems that manage them, where a robot may include any programmable machine provisioned with sensors, actuators, etc., configured to perform one or more physical functions.

OT administrators, the persons who oversee OT assets and tasks, are often plant managers or members of a plant operations team. Not unlike IT administrators, OT administrators may prefer to standardize on one technology platform to manage their infrastructure. Examples of pervasive OT management systems include Rockwell Automation FactoryTalk and Siemens TIA Portal, which use industry-specific protocols such as Ethernet/Industrial Protocol (Ethernet/IP) and PROFINET, as a foundational protocol, not only to facilitate control of robots and other OT assets, but also to monitor and configure those assets. Industrial environments often standardize on one control system vendor and, in general, Ethernet/IP environments do not co-exist with PROFINET environments.

Automation systems are often closed systems that use one protocol for all tasks and integration with traditional IT assets has been largely confined to networking hardware such as ruggedized switches, industrial routers, industrial gateways, and the like.

SUMMARY

In accordance with teachings disclosed herein, the lack of solutions for integrating servers and other traditional IT compute resources within an OT environment is addressed by disclosed methods, systems, and/or software. In at least one embodiment, a disclosed method includes loading a driver stack for an industrial automation control (IAC) communication protocol into a management controller, e.g., a baseboard management controller (BMC) or remote access controller (RAC) of an information handling system, e.g., a server, connecting the management controller to an IAC network interconnect, and communicating with the driver stack to perform operations for integrating the management controller into the IAC network as a remotely manageable resource of the IAC network. The operations for integrating the management controller into the IAC network may include discovering the management controller, obtaining configuration information from the management controller, wherein the configuration information includes information indicative of a configurable management controller resource, and configuring a setting of the management controller resource. In at least some embodiments, the configurable management controller resource is a network interface card (NIC) and the configurable setting is an Internet protocol (IP) address of the NIC, which may be either an in-band NIC or an out-of-band NIC. In at least some embodiments, the driver stack is a PROFINET stack and performing the operations includes Discovery and Basic Configuration Protocol (DCP) requests and responses.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
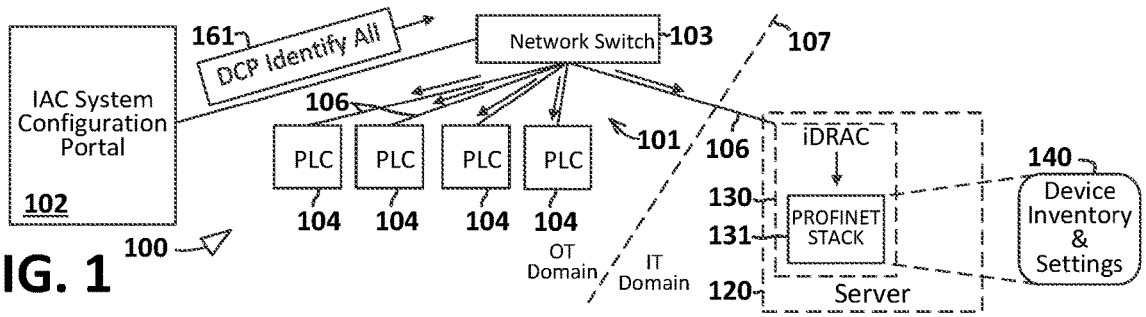
FIGS. 1, 2, 3, 4, and 5 illustrate an IAC platform at five stages in a discovery and configuration process in accordance with disclosed teachings.

Exemplary embodiments and their advantages are best understood by reference to FIGS. 1-7, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Turning now to the drawings, FIG. 1 depicts an IAC platform 100 suitable for use in conjunction with disclosed teachings for incorporating an IT resource such as a general purpose server-class system within an IAC network. The IAC platform 100 of FIG. 1 encompasses an IAC network 101 that includes a system configuration portal 102 and a group of programmable logic controllers (PLCs) 104, each of which is communicatively to a network switch 103 via a corresponding IAC interconnect 106. Any one or more of the PLCs 104 may be communicatively coupled or otherwise associated with a corresponding machine, sensor, actuator, etc. (omitted from FIG. 1).

IAC network 101 may be implemented in compliance with any of various industry recognized IAC protocols and technologies. For the sake of clarity and brevity, PROFINET is the IAC protocol referenced most frequently in the description of the illustrated examples, but those of ordinary skill in the field will appreciate that disclosed features are not limited to any particular IAC technology, platform, protocol, or standard.

FIG. 1 further illustrates a boundary 107 conveying historical functional and operational distinctions between an OT domain to the "west" of boundary 107 and an IT domain to the east. As suggested by its name, the IT domain includes one or more IT resources represented, in FIG. 1, by a server 120. The illustrated server 120 includes a dedicated management controller such as a BMC or RAC typically deployed to facilitate remote management of the host server. The management controller illustrated in FIG. 1 is identified as iDRAC 130, where iDRAC refers to a Dell Technologies brand management controller. Other embodiments may however use any suitable management controller.

As depicted in FIG. 1, a PROFINET protocol stack 131 has been loaded, deployed, or otherwise installed within iDRAC 130. PROFINET protocol stack 131 includes all required services to enable server 120 to participate in PROFINET-compliant communications and/or transactions over a suitable communication channel. In addition, the illustrated PROFINET protocol stack 131 includes device inventory and settings information 140 indicative of any switch or other resources provisioned in iDRAC 131 or server 120 that might be suitable for use within IAC network 101.

FIG. 1 through FIG. 5 illustrate IAC platform 100 at each of five steps of a discovery and configuration process. The depicted sequence of events integrate, incorporate, or otherwise onboard a traditional IT asset, such as the depicted server 120, into IAC platform 100.

FIG. 1 depicts a first step of the discovery and configuration process, during which configuration portal 102 issues a multicast DCP Identify All request 161, which is multicast routed to each of the illustrated endpoints of IAC network 100 including the PLCs 104 as well as iDRAC 130.

Figure 2:
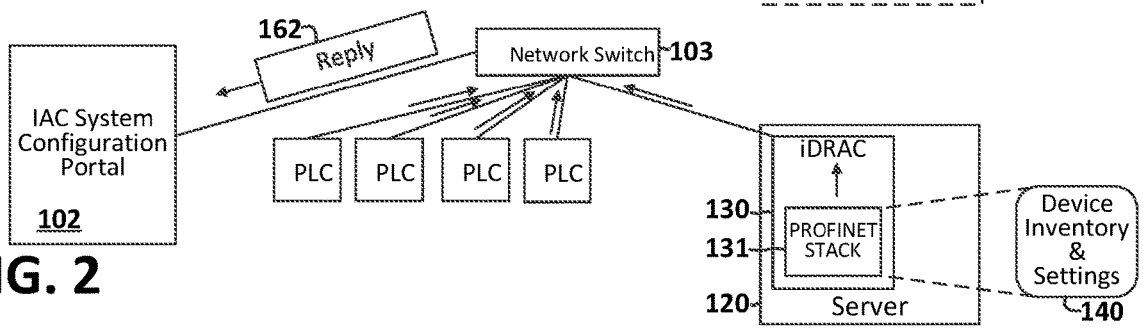

In FIG. 2, iDRAC 130, in accordance with PROFINET stack 131 and the DCP protocol, sends a uni-cast reply 162 back to IAC system configuration portal 102, at which point the presence of iDRAC 130 within IAC network 101 has been discovered by an OT domain resource. Although each of the PLCs 104 may also send replies analogous to the illustrated reply 162 from iDRAC 130, the PLC-generated replies are omitted from FIG. 1 for clarity.

Figure 3:
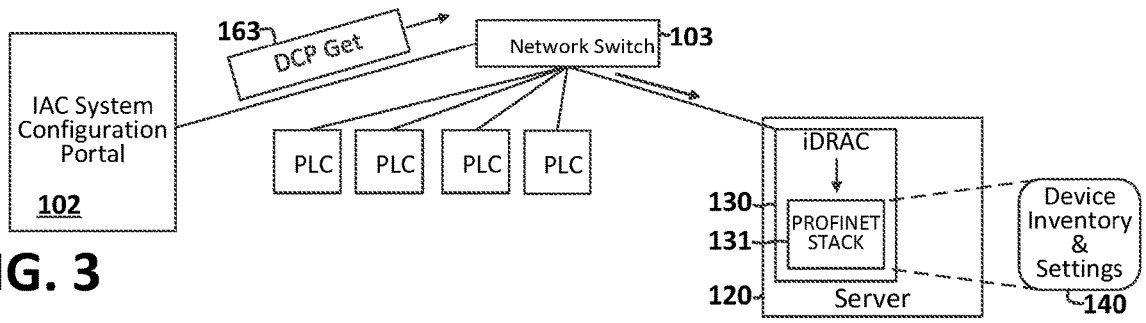
Figure 4:
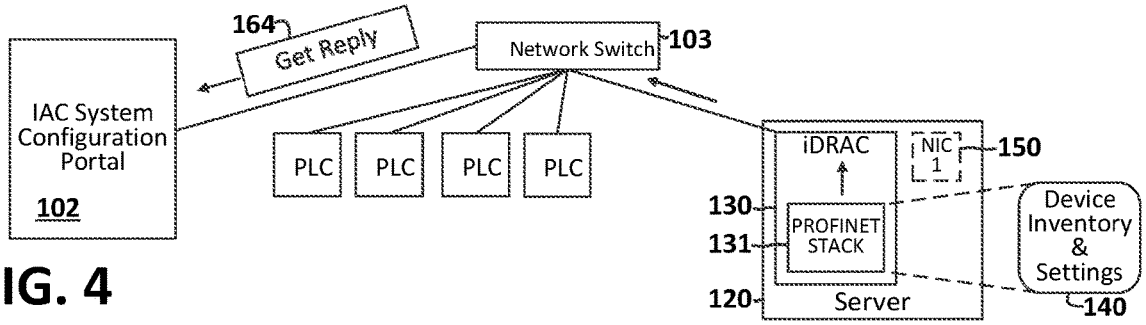

In FIG. 3, after discovering iDRAC 130 upon receiving reply 162, IAC system configuration portal 102 sends a unicast DCP Get request 163 addressing iDRAC 130 to obtain an inventory of resources provisioned in iDRAC 130. In FIG. 4, iDRAC 130 responds to Get request 163 by returning a Get reply 164 containing information extracted from a data structure, identified as device inventory and settings 140, within PROFINET stack 131. In the illustrated example, iDRAC 130 is provisioned with a network interface card (NIC) identified as NIC 1 (150), which is indicated within a payload of Get reply 164. NIC 1 (150) may correspond to a dedicated iDRAC NIC, sometimes referred to as an out-of-band NIC typically used in conventional IT environments to perform out-of-band management of server 120. In other embodiments, NIC 1 (150) may correspond to an in-band NIC of server 120.

Figure 5:
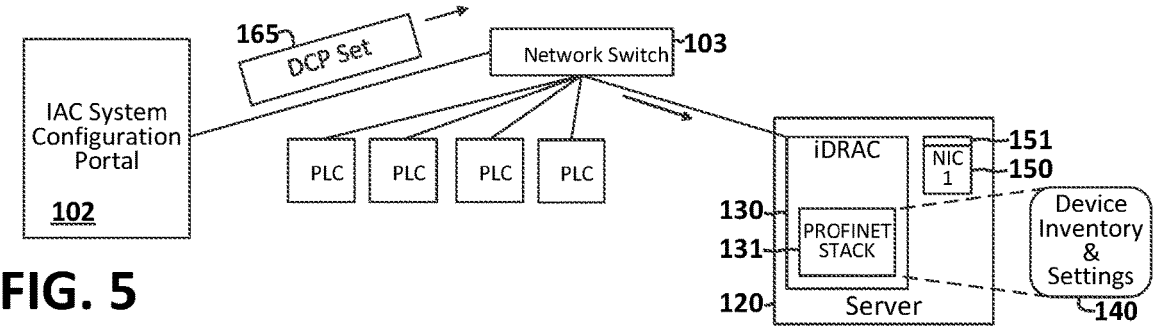

In FIG. 5, upon learning of NIC 1 (150), IAC system configuration portal 102 sends a unicast DCP Set 165 command addressed to iDRAC 130 to set one or more configuration settings of NIC 1 (150). In at least one embodiment, the configuration settings set by Set command 165 include an IP address 151 assigned to NIC 1 (150) by IAC system configuration portal 102, thereby integrating NIC 1 (150) into IAC network 101.

Figure 6:
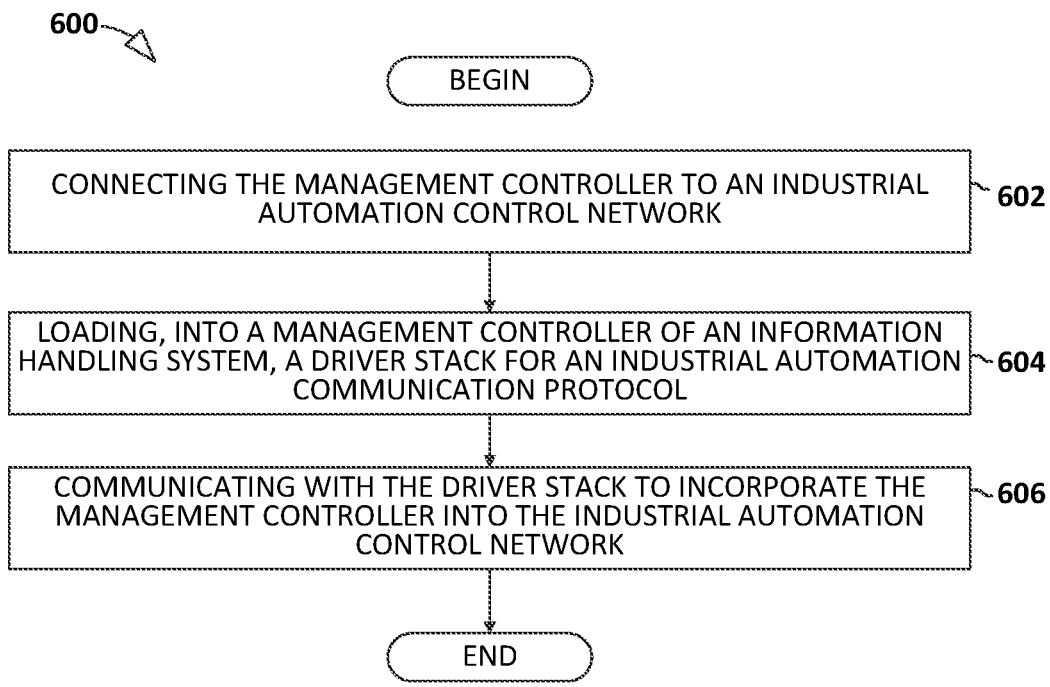
FIG. 6 illustrates a flow diagram of a method for integrating a server into an OT network.

Referring now to FIG. 6, a flow diagram illustrates a method 600, encompassing the steps illustrated in FIGS. 1 through 5, for integrating an IT resource within an IAC network such as IAC network 101. The method 600 illustrated in FIG. 6 begins by connecting (step 602) a management controller, e.g., iDRAC 130, of an information handling system, e.g., server 120, to an IAC network, e.g., IAC network 101. In at least some embodiments, IAC Network 101 may employ an Ethernet derivative interconnect such as a PROFIBUS or Ethernet/IP interconnect, and the connection with iDRAC 130 may be achieved with a conventional Ethernet cable. The illustrated method 600 continues with the loading (step 604) of an IAC communication stack, e.g., a PROFINET stack. A resource such as the IAC system configuration portal 102 may then communicate (step 606) with the IAC communication stack to perform operations, such as those illustrated in FIGS. 1 through 5, to integrate the management controller into the IAC network.

Figure 7:
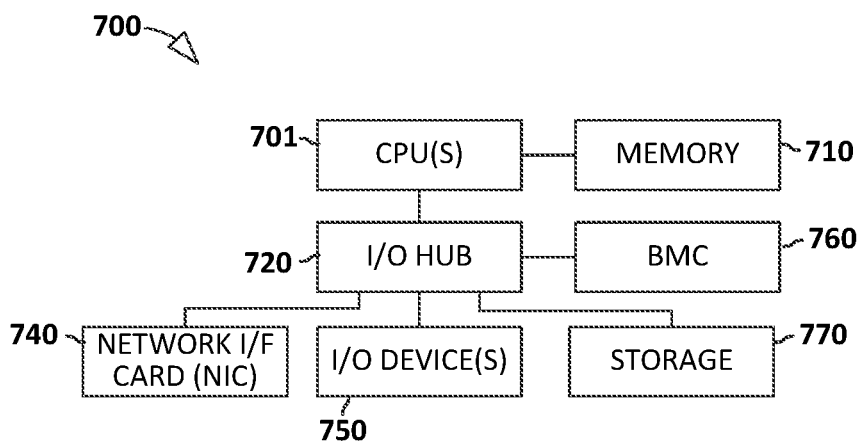
FIG. 7 illustrates an example information handling system suitable for use in conjunction with methods and systems depicted in FIG. 1 through FIG. 6.

Referring now to FIG. 7, any one or more of the elements illustrated in FIG. 1 through FIG. 5 may be implemented as or within an information handling system exemplified by the information handling system 700 illustrated in FIG. 7. The illustrated information handling system includes one or more general purpose processors or central processing units (CPUs) 701 communicatively coupled to a memory resource 710 and to an input/output hub 720 to which various I/O resources and/or components are communicatively coupled. The I/O resources explicitly depicted in FIG. 7 include a NIC 740, storage resources 770, and additional I/O devices, components, or resources 750 including as non-limiting examples, keyboards, mice, displays, printers, speakers, microphones, etc. The illustrated information handling system 700 includes a BMC 760 providing, among other features and services, an out-of-band management resource which may be coupled to a management server (not depicted). In at least some embodiments, BMC 760 may manage information handling system 700 even when information handling system 700 is powered off or powered to a standby state. BMC 760 may include a processor, memory, an out-of-band NIC (not depicted in FIG. 7) separate from and physically isolated from an in-band NIC 740 of information handling system 700, and/or other embedded information handling resources. In certain embodiments, BMC 760 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
    loading a driver stack for an industrial automation control (IAC) communication protocol into a management controller of an information handling system;
    connecting the management controller to an IAC network interconnect; and
    communicating with the driver stack to perform particular operations for integrating the management controller into the IAC network as a remotely manageable resource of the IAC network, wherein the particular operations include:
        discovering the management controller;
        obtaining configuration information from the management controller, wherein the configuration information includes information indicative of a configurable management controller resource; and
        configuring a setting of the management controller resource.

2. The method of claim 1, wherein the management controller resource comprises a network interface card (NIC) of the management controller and wherein the setting associated with the management controller comprises an Internet protocol (IP) address of the NIC.

3. The method of claim 1, wherein the information handling system comprises a server and wherein the server includes:
    a central processing unit (CPU) and a computer readable memory, accessible to the CPU, including processor-executable instructions; and
    an in-band network interface card communicatively coupled to the CPU.

4. The method of claim 1, wherein the management controller is selected from:
   a baseboard management controller; and
   a remote access controller.

5. The method of claim 1, wherein communicating with the driver stack comprises exchanging Discovery and Basic Configuration Protocol (DCP) requests and responses.

6. The method of claim 1, wherein the IAC driver stack comprises a PROFINET protocol driver stack.

7. An information handling system, comprising:
   a central processing unit (CPU); and
   a computer readable memory, accessible to the CPU, including processor-executable instructions that, when executed by the CPU, cause the system to perform operations comprising:
      loading a driver stack for an industrial automation control (IAC) protocol into a management controller of the information handling system;
      connecting the management controller to an IAC network interconnect; and
      communicating with the driver stack to perform particular operations to integrate the management controller into the IAC network as a remotely manageable resource of the IAC network, wherein the particular operations include:
         discovering the management controller;
         obtaining configuration information from the management controller, wherein the configuration information includes information indicative of a configurable management controller resource; and
         configuring a setting of the management controller resource.

8. The information handling system of claim 7, wherein the management controller resource comprises a network interface card (NIC) of the management controller and wherein the setting associated with the management controller comprises an Internet protocol (IP) address of the NIC.

9. The information handling system of claim 7, wherein the information handling system comprises a server and wherein the server includes:
   a central processing unit (CPU) and a computer readable memory, accessible to the CPU, including processor-executable instructions; and
   an in-band network interface card communicatively coupled to the CPU.

10. The information handling system of claim 9, wherein the management controller is selected from:
    a baseboard management controller; and
    a remote access controller.

11. The information handling system of claim 7, wherein communicating with the driver stack comprises exchanging Discovery and Basic Configuration Protocol (DCP) requests and replies.

12. The information handling system of claim 7, wherein the IAC driver stack comprises a PROFINET protocol driver stack.

13. A non-transitory computer readable medium including processor executable instructions that, when executed by a processor, cause the processor to perform operations, comprising:
    loading a driver stack for an industrial automation control (IAC) protocol into a management controller of an information handling system;
    connecting the management controller to an IAC network interconnect; and
    communicating with the driver stack to perform particular operations to integrate the management controller into the IAC network as a remotely manageable resource of the IAC network, wherein the particular operations include:
       discovering the management controller;
       obtaining configuration information from the management controller, wherein the configuration information includes information indicative of a management controller resource; and
       configuring a setting associated with the management controller resource.

14. The non-transitory computer readable medium of claim 13, wherein the management controller resource comprises a network interface card (NIC) of the management controller and wherein the setting associated with the management controller comprises an Internet protocol (IP) address of the NIC.

15. The non-transitory computer readable medium of claim 13, wherein the information handling system comprises a server and wherein the server includes:
    a central processing unit (CPU) and a computer readable memory, accessible to the CPU, including processor-executable instructions; and
    an in-band network interface card communicatively coupled to the CPU.

16. The non-transitory computer readable medium of claim 13, wherein the management controller is selected from:
    a baseboard management controller; and
    a remote access controller.

17. The non-transitory computer readable medium of claim 13, wherein the IACS driver stack comprises a PROFINET driver stack and wherein communicating with the driver stack comprises exchanging Discovery and Basic Configuration Protocol (DCP) requests and replies.

* * * * *